(12) United States Patent
Arakawa et al.

(10) Patent No.: US 8,428,591 B2
(45) Date of Patent: Apr. 23, 2013

(54) METHOD OF TRANSLATING CELLULAR CARRIERS

(75) Inventors: Yoshiyuki Arakawa, Tokyo (JP); Shin-ichi Noguchi, Machida (JP); Larry Benton Richards, Jr., Fukushima (JP); Theodore Sizer, II, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 979 days.

(21) Appl. No.: 12/155,370

(22) Filed: Jun. 3, 2008

(65) Prior Publication Data
US 2009/0003287 A1    Jan. 1, 2009

Related U.S. Application Data

(60) Provisional application No. 61/007,907, filed on Jun. 28, 2007.

(51) Int. Cl.
*H04W 4/00* (2009.01)
(52) U.S. Cl.
USPC ........ 455/435.2; 455/403; 455/420; 455/118; 455/207; 455/213
(58) Field of Classification Search ............... 455/435.2, 455/403, 20, 118, 207, 213
See application file for complete search history.

(56) References Cited

U.S. PATENT DOCUMENTS

| 5,222,144 | A |   | 6/1993 | Whikehart |         |
|-----------|---|---|--------|-----------|---------|
| 5,666,293 | A | * | 9/1997 | Metz et al. | 709/220 |
| 6,256,303 | B1 | * | 7/2001 | Drakoulis et al. | 370/344 |
| 6,806,820 | B1 | * | 10/2004 | Dhalla et al. | 341/144 |
| 2006/0218298 | A1 | * | 9/2006 | Knapp et al. | 709/238 |

FOREIGN PATENT DOCUMENTS

| JP | 2006-516867 | 7/2006 |
|----|-------------|--------|
| WO | WO 2004/073229 | 8/2004 |
| WO | WO 2005/000743 | 1/2005 |
| WO | WO 2006/119489 | 11/2006 |

OTHER PUBLICATIONS

International Search Report and Written Opinion dated Feb. 23, 2010.
Japanese Office Action dated May 7, 2012 issued in Japanese Application No. 2010-514809.
Chinese Office Action dated Jul. 4, 2012 issued in Chinese Application No. 200880022528.1.

* cited by examiner

*Primary Examiner* — Nghi H Ly
(74) *Attorney, Agent, or Firm* — Harness, Dickey & Pierce, P.L.C.

(57) ABSTRACT

A plurality of carrier signals in a wide band signal is converted into a plurality of digital carrier signals. Each of the plurality of carrier signals is at a respective frequency in the wide band signal. At least one of the plurality of digital carrier signals is translated to a different frequency.

16 Claims, 12 Drawing Sheets

# METHOD OF TRANSLATING CELLULAR CARRIERS

PRIORITY STATEMENT

This non-provisional U.S. patent application claims priority under 35 U.S.C. §119 to U.S. provisional Patent Application No. 61/007,907 with an original filing date of Jun. 28, 2007. U.S. provisional Patent Application No. 61/007,907 was converted on Oct. 18, 2007 from U.S. patent application Ser. No. 11/819,619 filed on Jun. 28, 2007, the entire contents of both applications of which are incorporated herein.

BACKGROUND OF THE INVENTION

In a wireless network system, for example, a code division multiple access (CDMA) network, a certain amount of spectrum is available to the system. The amount or bandwidth of the spectrum may differ depending on the standard governing the wireless network system, government regulations, etc. Also, the position of the allocated bandwidth in the spectrum may differ depending on the standard governing the wireless network system, government regulations, etc. Still further, the number of carriers supported by the allocated bandwidth may depend on the amount of allocated bandwidth, the position of the bandwidth within the spectrum, standards, etc.

For example, one 5 MHz CDMA system includes three (3) carriers, each occupying a respective 1.25 MHz of the 5 MHz bandwidth. A radio frequency signal for a carrier frequency band with a 1.25 MHz bandwidth may hold up to 64 channels (voice or data).

The assignment of carriers to frequency bands in the allocated bandwidth, the amount of allocated bandwidth and the position of the allocated bandwidth are fixed within the system. Namely, using the 5 MHz CDMA system described above as an example, two different 5 MHz CDMA systems may have different carrier frequency band allocations, and/or may have differently positioned 5 MHz bandwidths.

Because several components (e.g., receivers, etc.) of a wireless system are dependent on the allocated bandwidth, position of the allocated bandwidth within the system, the frequency band allocations, etc., these components of a wireless system may often be system specific. Namely, the components of one system are often not useable in another system. This lack of flexibility results in higher costs of design and manufacture of wireless system components.

SUMMARY OF THE INVENTION

Example embodiments of the present invention provide a method of translating cellular carriers.

In an example embodiment, a method of translating cellular carriers includes converting a plurality of carrier signals in a wide band signal into at least one individual digital carrier signal, each of the at least one individual carrier signal at a respective frequency in the wide band signal, and translating the at least one individual digital carrier signal to a different frequency.

BRIEF DESCRIPTION OF THE DRAWINGS

Example embodiments of the present invention will become more fully understood from the detailed description given herein below and the accompanying drawings, which are given by way of illustration only and thus are not limiting of the example embodiments of the present invention.

DETAILED DESCRIPTION OF THE EXAMPLE EMBODIMENTS

Although example embodiments of the present invention will be described with reference to a code division multiple access (CDMA) network, a person of ordinary skill will recognize the example embodiments of the present invention may apply to other telecommunication systems, for example, WCDMA, GSM, tones in WiMax, etc.

Figure 1:
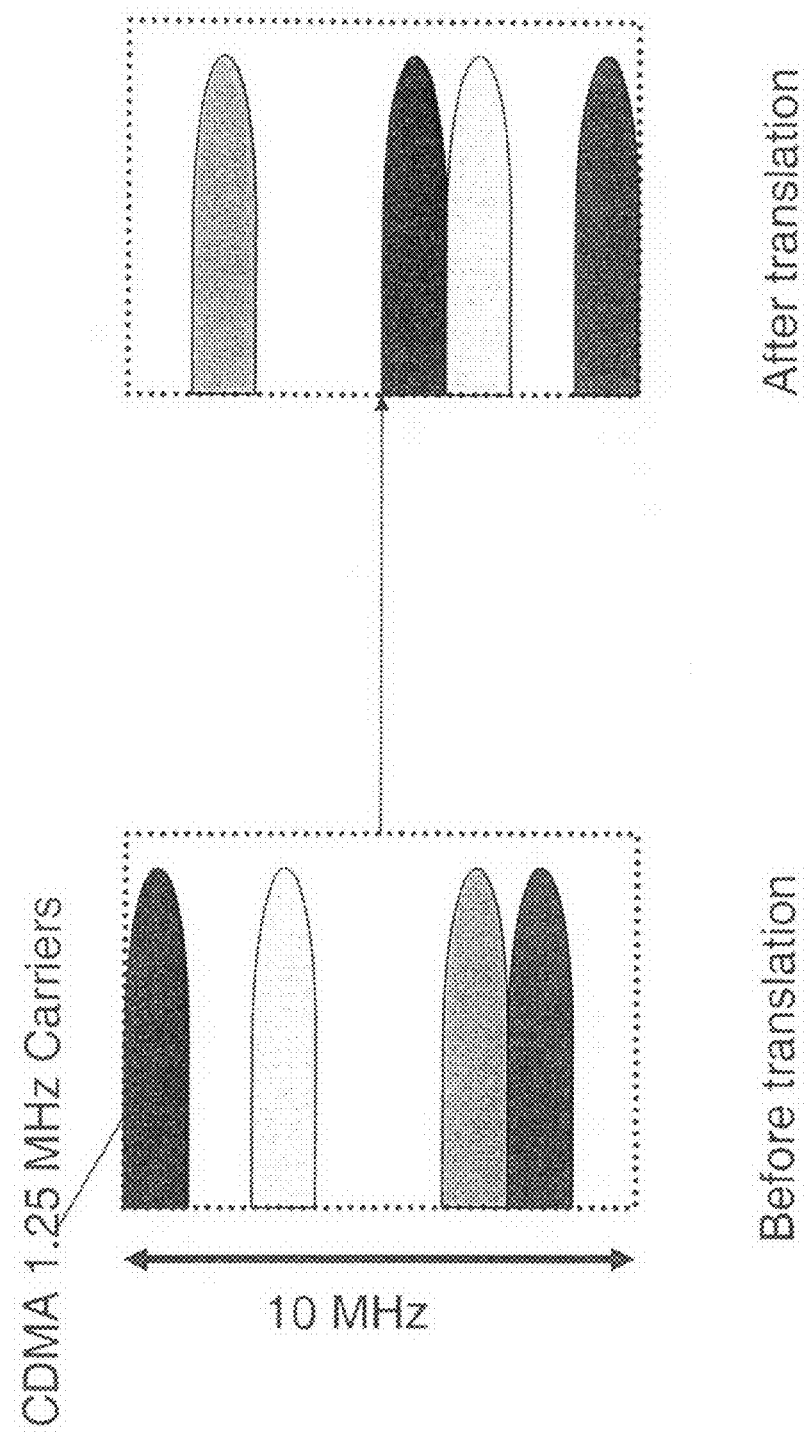
FIG. 1 illustrates a before and after translation of carriers in a wide band occupying a 10-MHz total band according to an example embodiment of the present invention.

FIGS. 1-12 illustrate methods of translating cellular carriers (carriers) according to example embodiments of the present invention. FIG. 1 shows a 10 MHz frequency band having four (4) carriers prior to frequency translation and after frequency translation. Each of the carriers occupies a 1.25 MHz bandwidth. Again, the carriers may be for a CDMA, WCDMA, GSM, or tones in WiMax system. Also, the embodiments will be described with respect to operation at a base station, but one skilled in the art will appreciate that the method embodiments are not limited in implementation to base stations.

Figure 2:
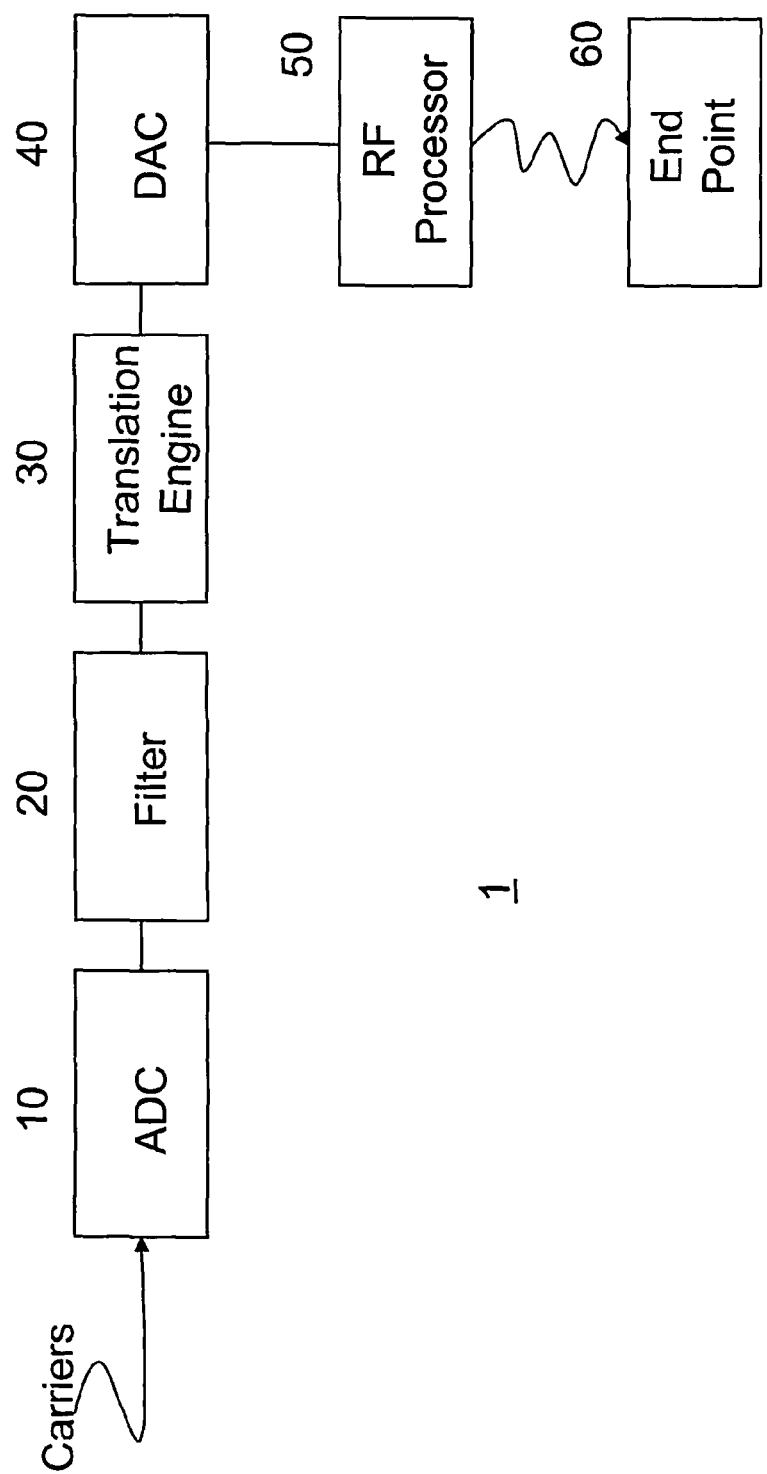
FIG. 2 illustrates a block diagram of a base station adapted to be used in an example embodiment of the present invention.
Figure 3:
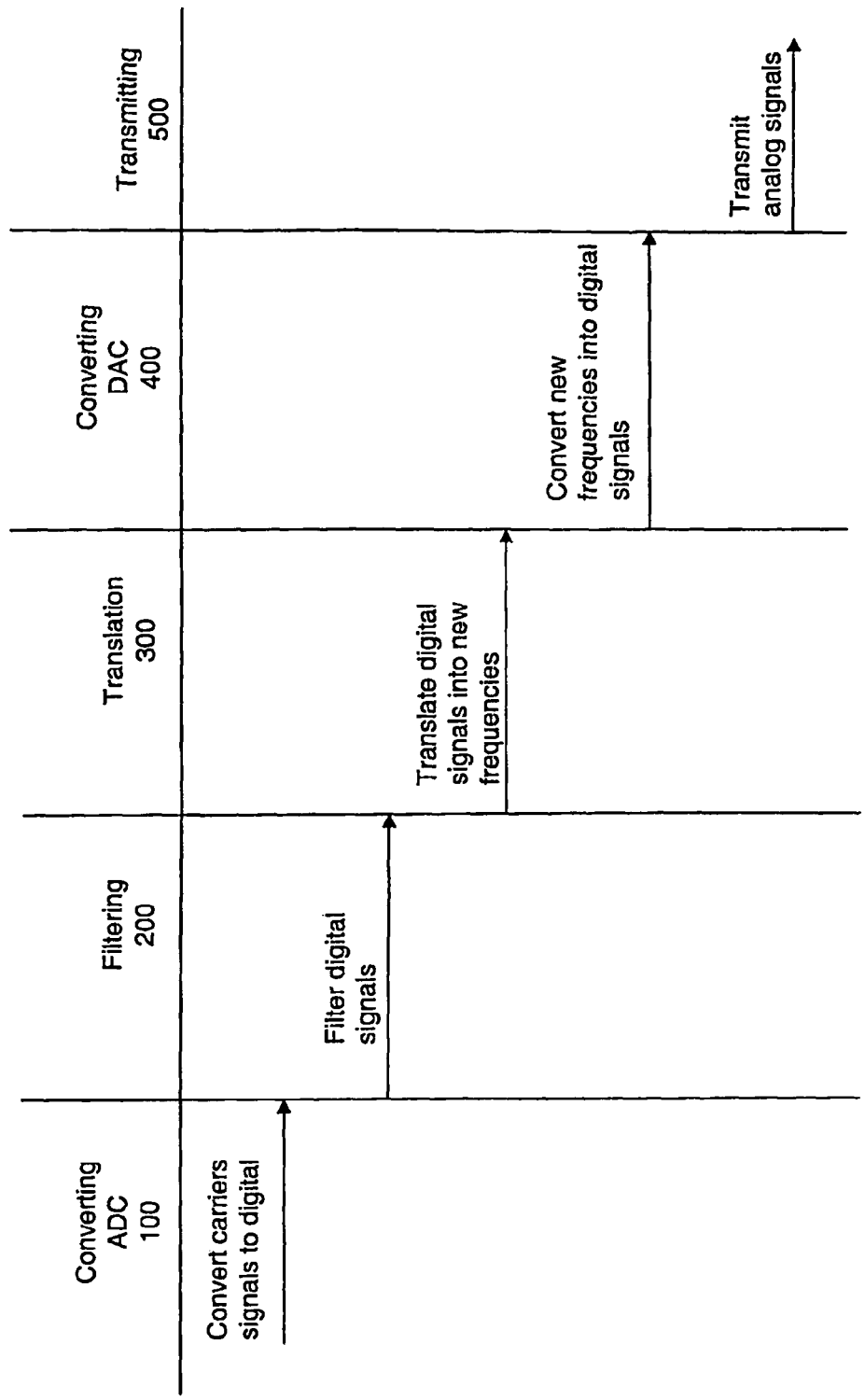
FIG. 3 illustrates a flow chart of a method of translating carriers according to an example embodiment of the present invention.

Referring to FIGS. 1, 2 and 3, at a base station 1 in step 100 the entire bandwidth, including the four (4) carriers, may be converted into digital signals by an analog to digital converter (ADC) 10 included in a receiver of the base station. The receiver may be a wideband radio receiver. Although the figures show four (4) analog carriers, it is well known to a person of ordinary skill that the carriers may be a single digital wideband signal. If the carriers are a single digital wideband signal, step 100 is skipped.

In step 200, the digital carriers are further processed by a digital filter 20. A digital representation of the 10 MHz bandwidth is transformed into four (4) digital representations (signals) of the four separate 1.25 MHz carriers.

In step 300, the digital signals are then sent to a translation engine 30, for example, a frequency translator. The translation engine translates one or more of the four (4) digital signals to new frequencies. The frequency in which a particular carrier resides at an input of the receiver may be translated to a new frequency by the translation engine 30. The translation of the digital signals is accomplished in the digital domain.

In step 400, the translated digital signals are sent to a digital to analog converter (DAC) 40 to be converted into analog signals. The analog signals may be sent to a radio frequency (RF) processor 50 to be further filtered and amplified, and then the analog baseband signals are transmitted to an end point 60 in step 500. As an option, after the individual carriers are separated and translated, separate D/A stages may be used to create four (4) different analog signals. As another option, a digital processing may be performed on the translated carriers to create a wideband signal (width may be equal to the width at the input, e.g., 10 MHz). The wideband signal may then be sent to the DAC 40.

As disclosed above in the example embodiment of the present invention, frequency flexibility will allow smooth transition between communication frequencies, and handle the ever increasing usage and capacity requirements that may result from increased usage. In addition, a signal radio output from a base station with multiple carriers may be used to drive outputs at multiple locations with fewer carriers.

Figure 4:
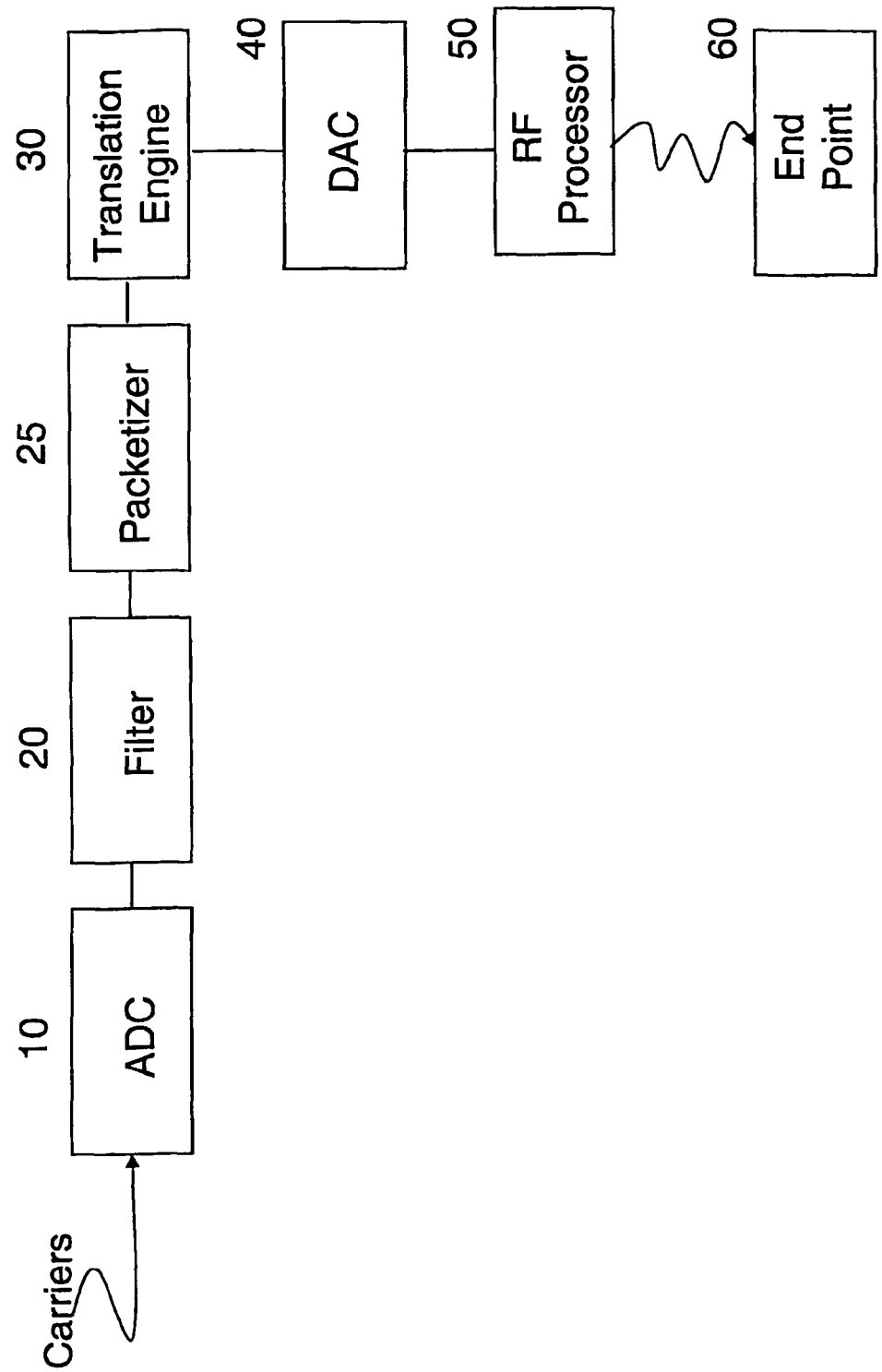
FIG. 4 is a block diagram of a base station adapted to be used in another example embodiment of the present invention.
Figure 5:
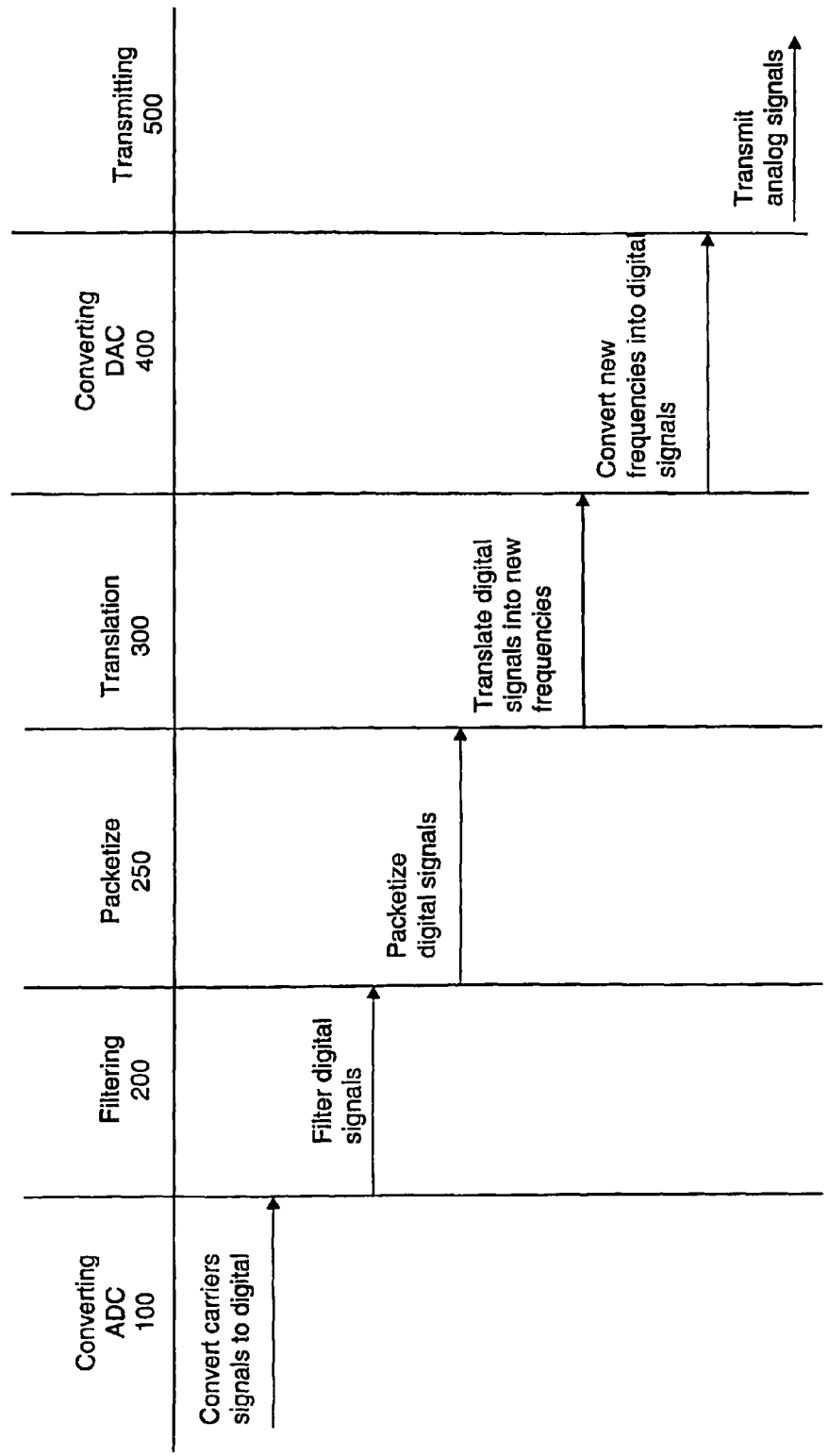
FIG. 5 illustrates a flow chart of another method of translating carriers according to an example embodiment of the present invention.

Another method of translating cellular carriers according to an example embodiment of the present invention is illustrated in FIGS. 4 and 5. A detailed description of similar steps with respect to the example embodiment illustrated in FIGS. 2 and 3 may be omitted for the sake of brevity.

Referring to FIGS. 4 and 5, carriers are converted by the ADC 10 and the converted digital signals are filtered by the digital filter 10 in steps 100 and 200, respectively. In step 250, each of the digital signals may be packetized by a packetizer 25 in known manners to create, for example, four (4) data packet streams. In step 300, the digital packet streams are sent to the translation engine 30 for translation to new frequencies. The digital packet stream may be sent through, for example, an Ethernet network. The translated digital packet streams are further sent to the DAC 40 to be converted into analog signals in steps 400. The analog signals may be sent to a radio frequency (RF) processor 50 to be further filtered and amplified, and then the analog signals are transmitted to an end point in step 500.

Figure 6:
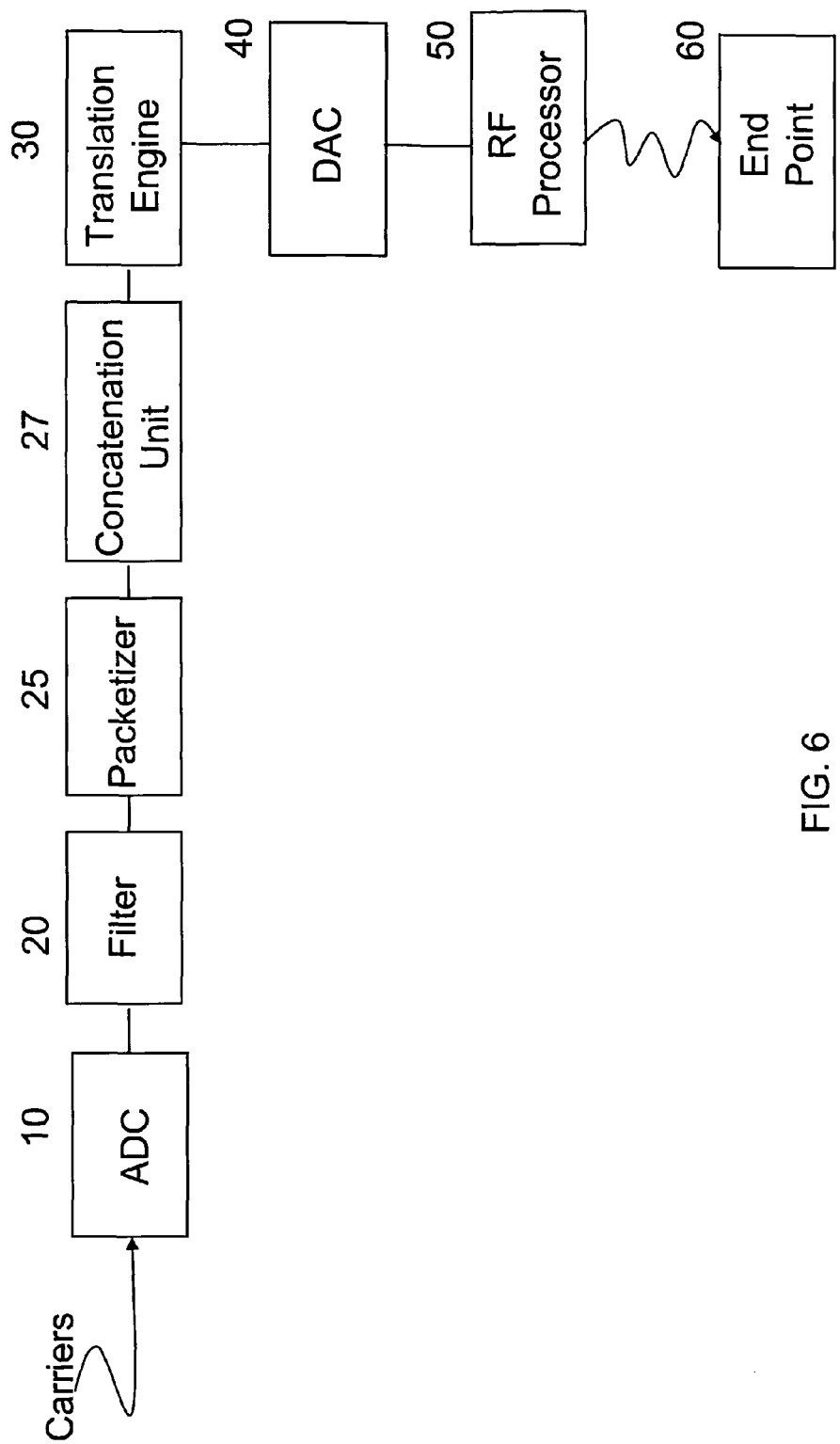
FIG. 6 is a block diagram of a base station adapted to be used in yet another example embodiment of the present invention.
Figure 7:
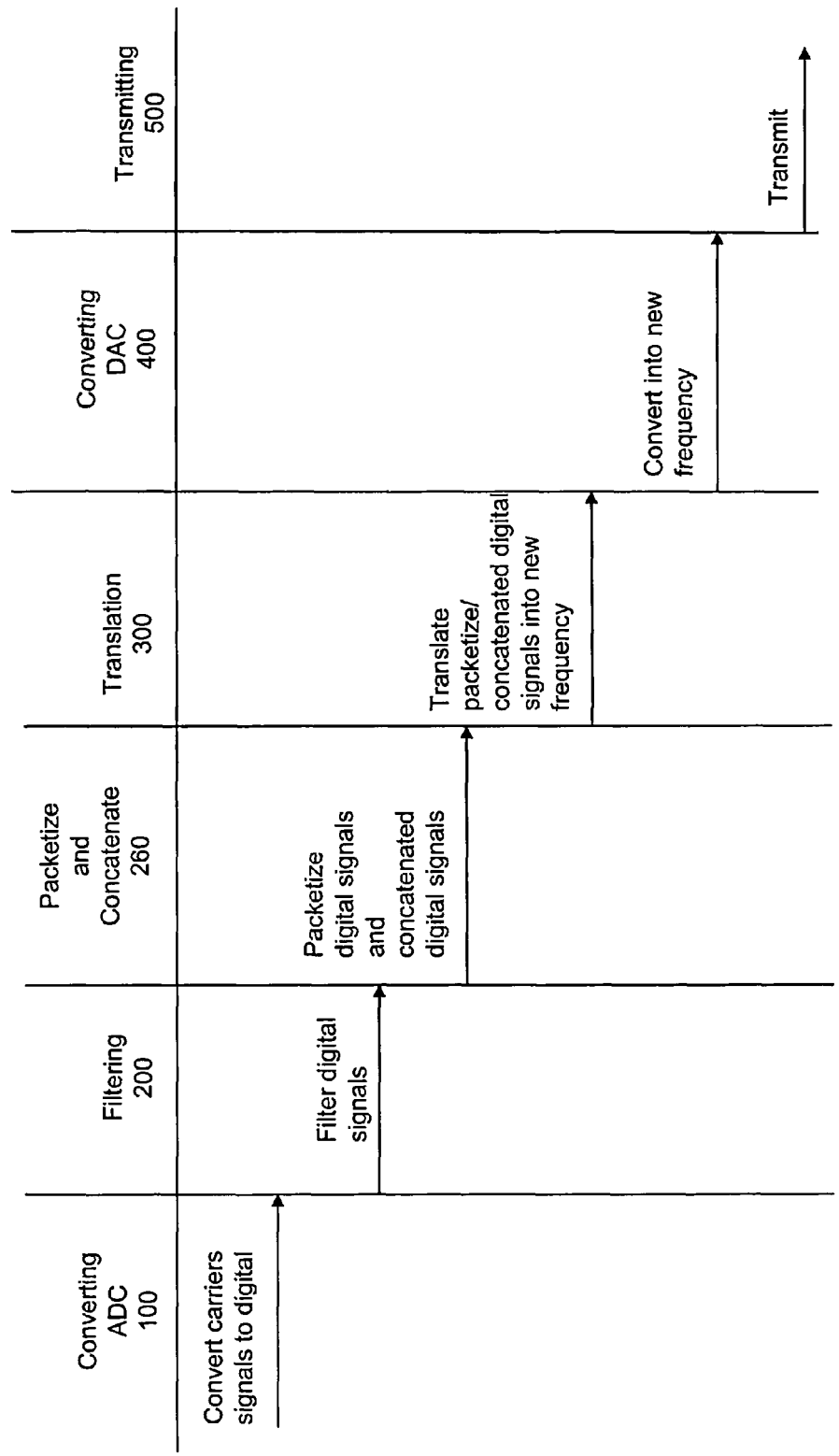
FIG. 7 illustrates a flow chart of yet another method of translating carriers according to an example embodiment of the present invention.

Another method of translating cellular carriers according to an example embodiment of the present invention is illustrated in FIGS. 6 and 7. A detailed description of similar steps with respect to the example embodiments illustrated in FIGS. 2-5 may be omitted for the sake of brevity.

Referring to FIGS. 6 and 7, carriers are converted by the ADC 10 and the converted digital signals are filtered by the digital filter 20 in steps 100 and 200, respectively. Each of the digital signals may be packetized by the packetizer 25 and each of the packets may be further concatenated by a concatenation unit 27 into a single concatenated digital packet stream in step 260. The concatenation unit 27 may be implemented by hardware or software. In step 300, the concatenated digital packet stream is sent to the translation engine 30 to be translated into a new frequency. The newly converted concatenated digital packet stream is sent to the DAC 40 to be converted into an analog signal in step 400. The analog signals may be sent to a radio frequency (RF) processor 50 to be further filtered and amplified, and then the concatenated analog signal is transmitted to an end point 60 in step 500.

Figure 8:
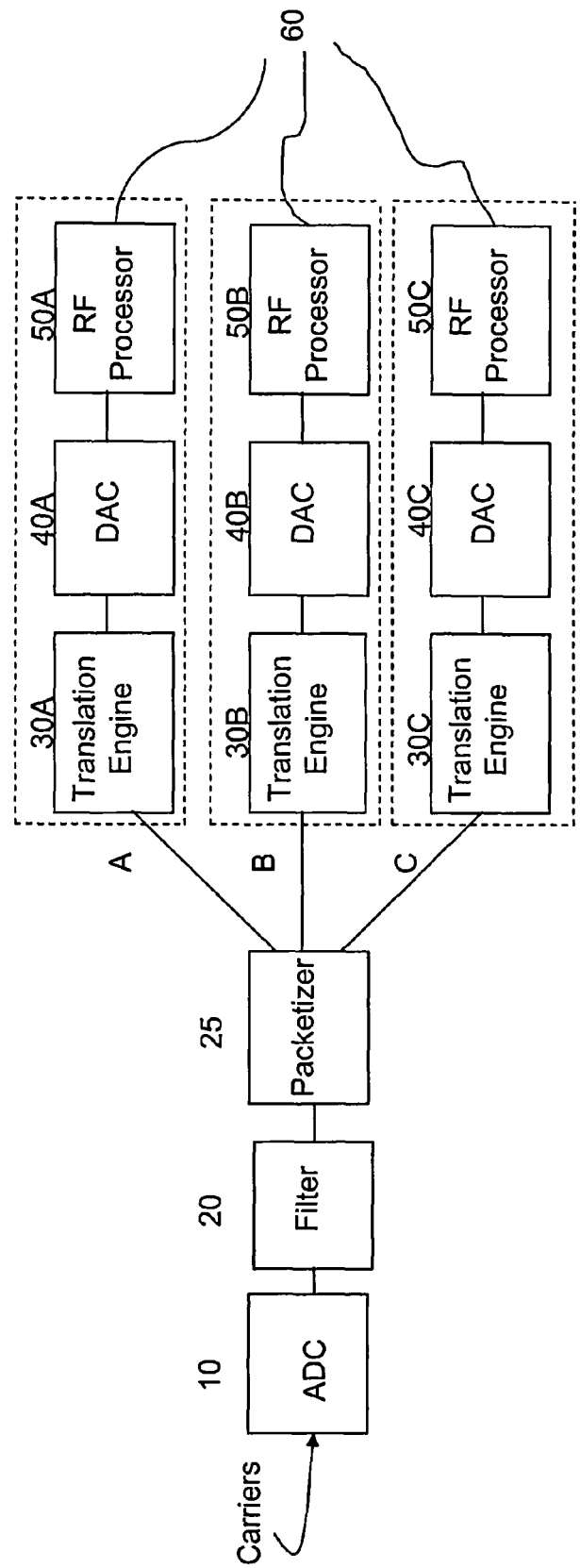
FIG. 8 is a block diagram of a base station adapted to be used in still another example embodiment of the present invention.
Figure 9:
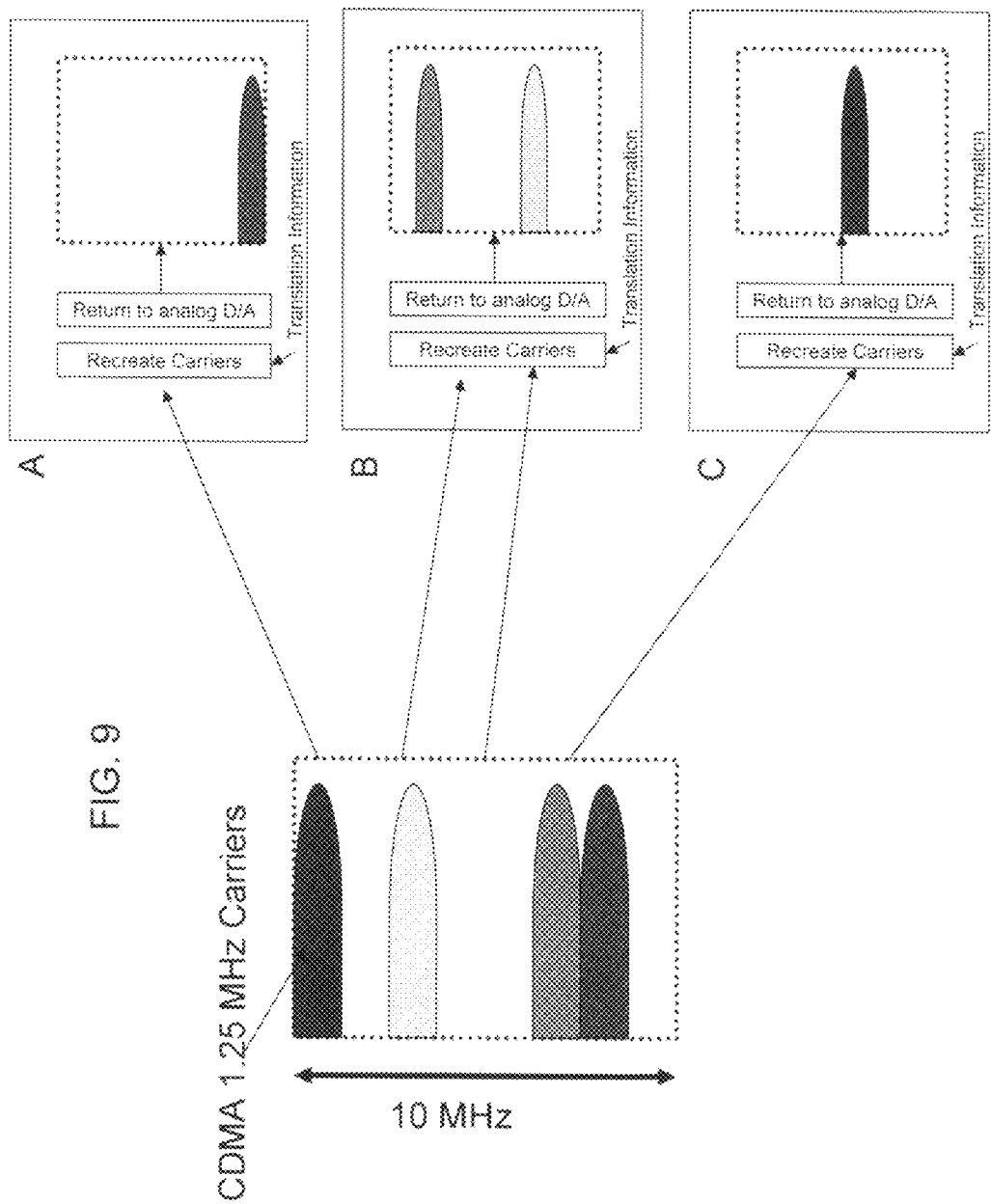
FIG. 9 illustrates carriers before and after translation according to another example embodiment of the present invention.
Figure 12:
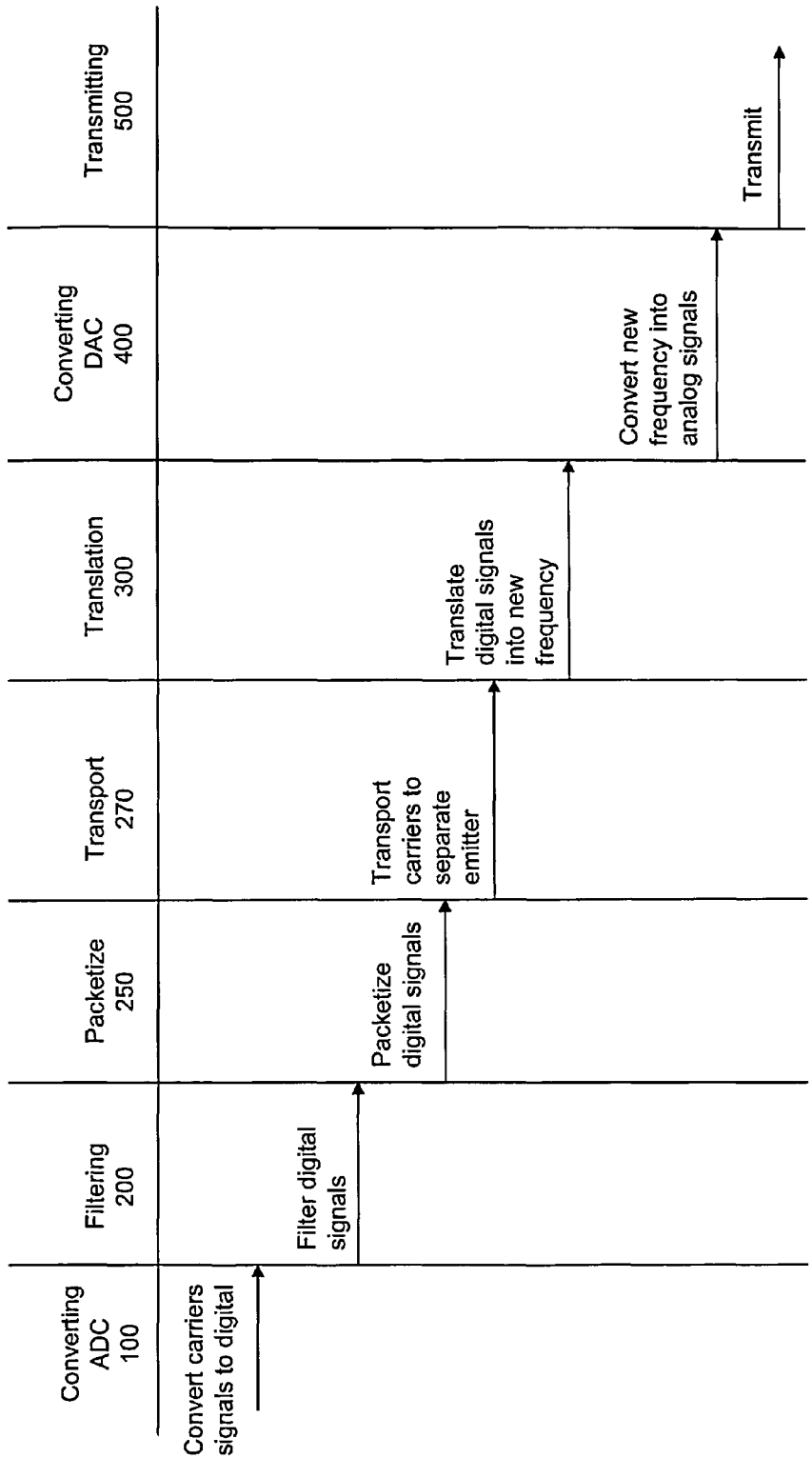

FIGS. 8, 9 and 12 illustrate another method of translating cellular carriers according to an example embodiment of the present invention.

Referring to FIGS. 8, 9 and 12, carriers are converted by the ADC 10 and the converted digital signals are filtered by the digital filter 20 in steps 100 and 200, respectively. Each of the digital signals may be packetized by the packetized 25 in step 250. As illustrated in FIGS. 8, 9 and 12, each digital packet stream (or, alternatively, each packet or group of packets) may be sent to separate and distinct emitter locations in step 270. A single wideband signal with one or several carriers may be fed to multiple locations, but with the same or fewer number of carriers in each single wideband signal than was received at the input of the receiver. As can be seen in the example embodiment illustrated in FIGS. 8 and 9, a single wideband signal with one carrier may be sent to location A; another single wideband signal with two carriers may be sent to location B; and yet another single wideband signal with one carrier may be sent location C.

At each distinct emitter locations, the digital packet(s) may be translated into a new frequency by, for example, a respective translation engine 30 in step 300. The newly converted digital packet(s) is sent to a respective DAC 40 to be converted into an analog signal(s). The analog signal(s) is processed by a respective RF processor 50, and transmitted to an end point 60 in steps 400 and 500, respectively.

Figure 10:
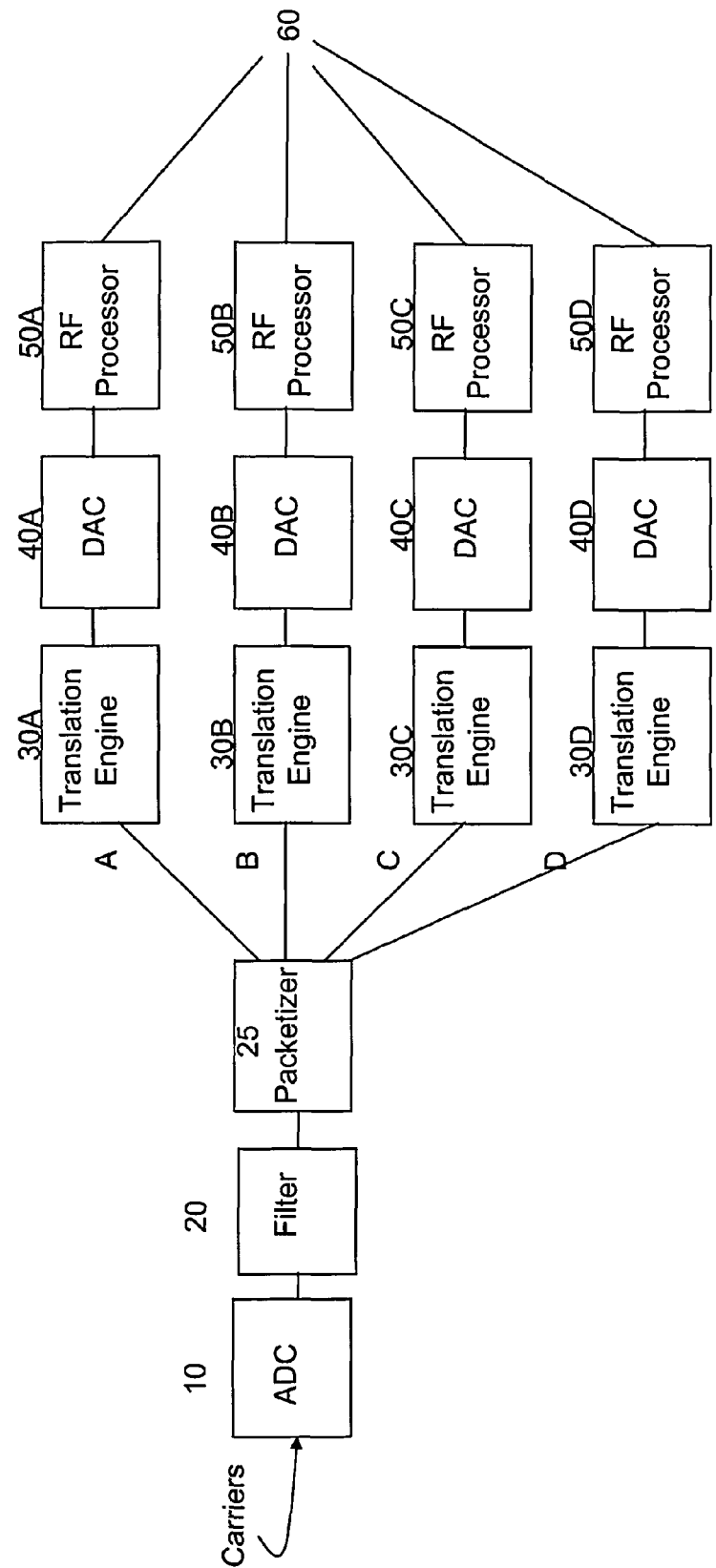
FIG. 10 is a block diagram of a base station adapted to be used in still an example embodiment of the present invention.
Figure 11:
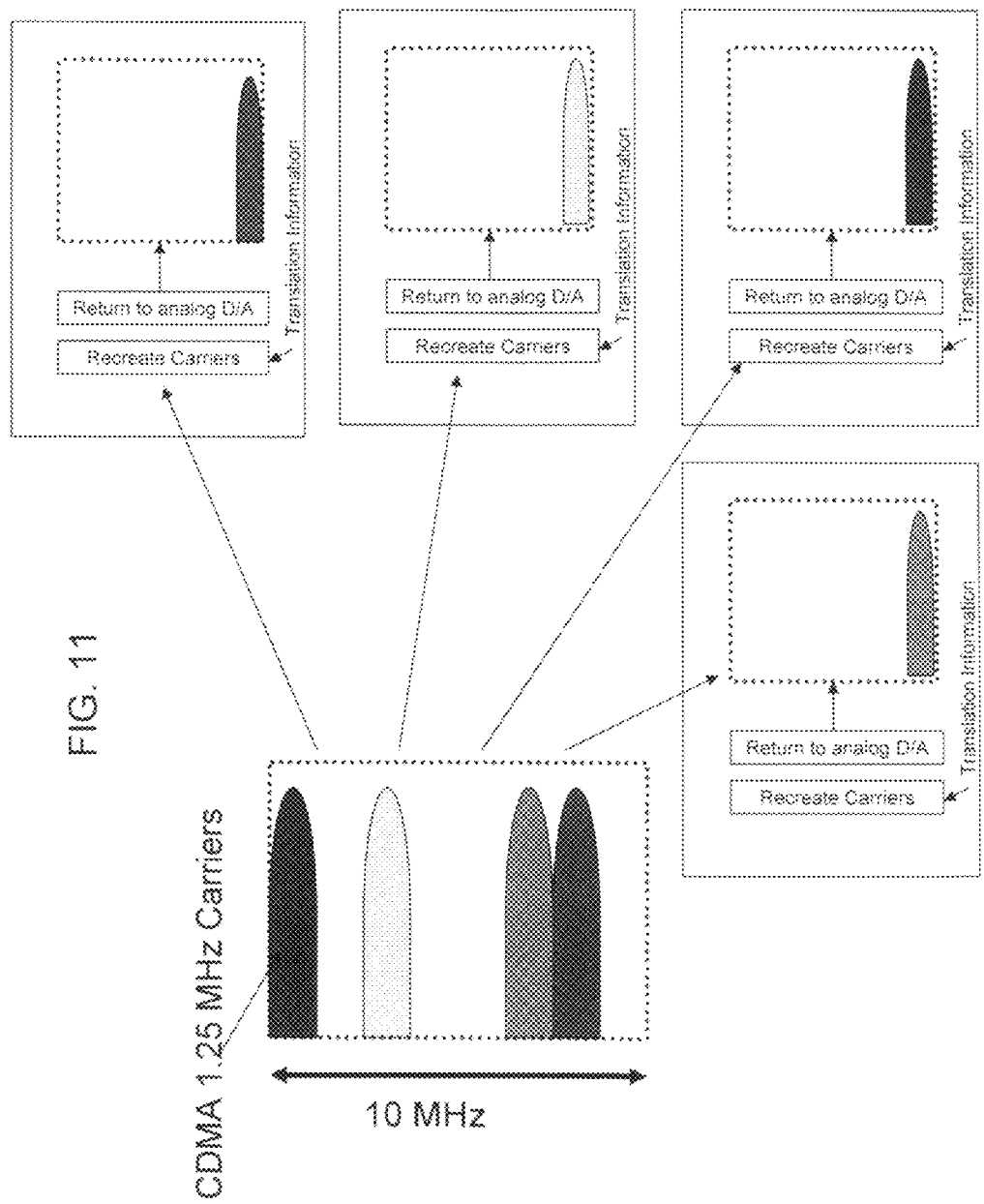
FIG. 11 illustrates carriers before and after translation according to an example embodiment of the present invention and FIG. 12 illustrates a flow chart of methods of translating carriers illustrated in FIGS. 8-11 according to example embodiments of the present invention.

FIGS. 10, 11 and 12 illustrate another method of translating cellular carriers according to an example embodiment of the present invention.

Referring to FIGS. 10, 11 and 12, carriers are converted by the DAC 10 and the converted digital signals are filtered by the digital filter 20 in steps 100 and 200, respectively. Each of the digital signals may be packetized by the packetizer 25 in step 250. In step 270, each of the digital packet streams (or, alternatively, each packet or group of packets) may be transported to separate and distinct emitter locations. As illustrated in FIGS. 10 and 11, a single wideband signal with only one carrier may be fed to one of the multiple emitter locations. At each of the separate and distinct emitter locations, a translation engine 30 translates each of the digital packets into a new frequency. Although the frequency of the four (4) carriers are different at the input of the receiver, each translation engine 30A-30D at the separate and distinct emitter locations translates each of the packet signals into the same frequency. Therefore, each of the packet signals is transmitted at the same frequency in step 500. This example embodiment may be applied to situations where access to only a single carrier's bandwidth is available, but the advantage of the cost effective use of multi-carrier radio technology is desired.

Although example embodiments of the present invention have been described with a band of frequency having four (4) cellular carriers, and the cellular carriers occupying a wideband signal of 10 MHz bandwidth, it will be appreciated that the number of cellular carriers and the bandwidth of the wideband signal may be varied without departing from the scope of the present invention.

Example embodiments of the present invention provide frequency flexibility. The frequency flexibility will allow smooth transition to government allocation of communication frequencies, and to handle the ever increasing usage and the capacity requirements that result from increased usage. The provision of this frequency flexibility may be accomplished in the digital domain by software. In addition, a signal radio output from a base station with multiple carriers may be used to drive multiple output remote radio heads with fewer carriers.

Example embodiments of the present invention will also allow wireless service providers the ability to position their carriers to better manage interference and optimally handle cellular traffic.

The example embodiments of the present invention being thus described, it will be obvious that the same may be varied in many ways. For example, while an example implementation of the present invention has been described with respect to a CDMA system, it will be appreciated that the present invention is applicable to other systems, including, for example, WCDMA, GSM, WiMax, etc. Such variations are not to be regarded as a departure from the invention, and all such modifications are intended to be included within the scope of the invention.

What is claimed is:

1. A method of translating carriers, comprising:
    converting a plurality of analog carrier signals within a wideband signal into a plurality of digital carrier signals, each of the analog carrier signals at a respective frequency in the wideband signal;
    packetizing the plurality of digital carrier signals into a plurality of digital packet streams;
    sending each of the plurality of digital packet streams to separate and distinct emitter locations; and
    translating each of the plurality of digital packet streams to a different frequency at each of the emitter locations, to adjust a position of the digital packet stream within the wideband signal.

2. The method of claim 1, further comprising:
    filtering at least one of the plurality of digital carriers signals; and
    wherein the packetizing step packetizes the at least one filtered digital carrier signal.

3. The method of claim 1, further comprising:
    digital processing the plurality of digital packet streams to create a wideband signal.

4. The method of claim 1, further comprising:
    converting the plurality of digital packet streams back to at least one analog carrier signal.

5. The method of claim 4, wherein the plurality of digital packet streams are converted into the at least one analog carrier signal in a separate D/A stage.

6. The method of claim 4, further comprising:
    amplifying and filtering the at least one converted analog carrier signal; and
    transmitting the at least one amplified and filtered signal to an endpoint.

7. The method of claim 1, wherein at least one of the carrier signals is a carrier in a code division multiple access (CDMA) network.

8. The method of claim 1, wherein at least one of the carrier signals is a carrier of one of a wideband code division multiple access (WCDMA), a Global System for Mobile Communications (GSM), and tones in a Worldwide Interoperability for Microwave Access (WiMax) systems.

9. The method of claim 1, further comprising:
    concatenating each of the plurality of digital packet streams.

10. The method of claim 1, wherein the translating adjusts at least one of the plurality of digital packet streams relative to other ones of the plurality of digital packet streams within the wideband signal.

11. A method of translating carriers, comprising:
    converting a plurality of analog carrier signals within a wideband signal into a plurality of digital carrier signals, each of the analog carrier signals at a respective frequency in the wideband signal;
    filtering at least one of the plurality of digital carrier signals;
    packetizing the plurality of digital carrier signals into a plurality of digital packet streams;
    sending each of the plurality of digital packet streams to separate and distinct emitter locations; and
    translating each of the plurality of digital packet streams to a different frequency at each of the emitter locations, to adjust a position of the digital packet stream within the wideband signal.

12. The method of claim 11, further comprising:
    converting the plurality of digital packet streams back into at least one analog carrier signal in a separate D/A stage.

13. The method of claim 11, further comprising:
    digital processing the plurality of digital packet streams to create a wideband signal.

14. The method of claim 11, further comprising:
    amplifying and filtering at least one converted analog carrier signal; and
    transmitting the amplified and filtered signal to an endpoint.

15. The method of claim 11, further comprising:
    concatenating each of the plurality of digital packet streams.

16. The method of claim 11, wherein the translating adjusts at least one of the plurality of digital packet streams relative to other ones of the plurality of digital packet streams within the wideband signal.

* * * * *